United States Patent [19]  [11]  4,294,621
Maurer et al.  [45]  Oct. 13, 1981

[54] PRODUCTION OF AN ANTICORROSIVE PIGMENT ON PHOSPHATE BASIS

[75] Inventors: Alexander Maurer; Renate Adrian, both of Hürth; Klaus Hestermann; Gero Heymer, both of Erfstadt, all of Fed. Rep. of Germany

[73] Assignee: Hoechst Aktiengesellschaft, Fed. Rep. of Germany

[21] Appl. No.: 141,135

[22] Filed: Apr. 16, 1980

[30] Foreign Application Priority Data

Apr. 20, 1979 [DE] Fed. Rep. of Germany ....... 2916029

[51] Int. Cl.$^3$ .......................... C08K 3/10; C09D 5/08
[52] U.S. Cl. ................................ 106/306; 106/14.21; 106/14.12; 260/40 R
[58] Field of Search ................. 106/306, 14.05, 14.12, 106/14.21; 423/306

[56] References Cited

U.S. PATENT DOCUMENTS 3,630,952 12/1971 Nielsen ................................ 106/306
4,153,465  5/1979 Hund et al. ......................... 423/306

Primary Examiner—Lorenzo B. Hayes
Attorney, Agent, or Firm—Connolly and Hutz

[57] ABSTRACT

The invention relates to the production of phosphorus-containing anticorrosive pigments with a particle size of at most 20 microns by reacting one or more calcium or magnesium compounds with phosphoric acid or acid alkali metal or ammonium phosphates by intimately mixing an aqueous suspension or solution of the reactants inside a dispersing means rotating at a speed of 3000 to 10,000 rpm. More particularly, fine pulverulent calcium and magnesium compounds are converted, with agitation, together with water and, if desired, a water-soluble alkanol to a homogeneous suspension or solution. The suspension or solution is intimately mixed, inside the dispersing means at 0° to 40° C. and in an approximately stoichiometric ratio, with the phosphoric acid or acid phosphate solution. Resulting and precipitated pigment is separated and dried under mild conditions while maintaining its content of water of crystallization. The anticorrosive pigment is comprised of a homogeneous mixture and/or mixed crystals of which 10 to 95 mol % is calcium hydrogen phosphate dihydrate, the balance being magnesium hydrogen phosphate trihydrate. An at least 55 weight % proportion consists of particles with a size of up to 5 microns with a BET-surface of at least 1 m$^2$/g.

8 Claims, No Drawings

PRODUCTION OF AN ANTICORROSIVE PIGMENT ON PHOSPHATE BASIS

A process for making phosphorus-containing anticorrosive pigments having a particle size of at most 20 microns by reacting compounds of the metals selected from magnesium, calcium strontium, barium, zinc, aluminum, iron, chromium and manganese with an oxygen acid of phosphorus or an alkali metal or ammonium salt of said acid at temperatures within the range 10° to 100° C., which comprises: intimately mixing and thereby reacting an aqueous suspension or solution of the reactants inside a dispersing means rotating at a speed of 300 to 10,000 rpm, separating and drying in conventional manner, precipitated pigment, the pigment consisting to an extent of at least 90% of particles with a size between 0.05 and 8 microns, has been described in German Patent Application P No. 28 40 820.0. As disclosed in working Examples 5 and 6 of that Application, magnesium hydrogen phosphate trihydrate ($MgHPO_4.3H_2O$) and calcium hydrogen phosphate dihydrate ($CaHPO_4.2H_2O$) are produced separately, each compound in pigment fineness.

A further corrosion-inhibiting pigment on phosphate basis for use in the surface protection of iron and iron alloys has been described in German Patent Application No. P 28 49 712.3, the pigment consisting of a mixture of 3 to 97 weight% of $MgHPO_4.3H_2O$, the balance being $CaHPO_4.2H_2O$. Mixtures of this kind can be made by mixing the individual components together. As shown in the Table forming part of German Patent Application No. P 28 49 712.3, the mixtures of $CaHPO_4.2H_2O$ and $MgHPO_4.3H_2O$, and more especially those mixtures which contain 70 to 90 weight% of $CaHPO_4.2H_2O$, were assigned anticorrosion values considerably higher than those assigned to the individual components making the mixture, or to $Zn_3(PO_4)_2.2H_2O$.

It has turned out, however, that commercial calcium and magnesium hydrogen phosphates are liable to undergo phase separation on being mixed together and even on being jointly ground.

The present invention now provides a process which avoids this adverse effect.

The present invention relates more particularly to a process for making phosphorus-containing anticorrosive pigments with a particle size of at most 20 microns by reacting one or more calcium or magnesium compounds with phosphoric acid or acid alkali metal or ammonium phosphates by intimately mixing an aqueous suspension or solution of the reactants inside a dispersing means rotating at a speed of 3000 to 10,000 rpm, separating and drying resulting precipitated pigment, which comprises: converting, with agitation, fine pulverulent calcium and magnesium compounds together with water and, if desired, a watersoluble alkanol to a homogeneous suspension or solution; intimately mixing said suspension or solution, inside the dispersing means at 0° to 40° C. and in an approximately stoichiometric ratio, with the phosphoric acid or solution of the acid phosphates; separating resulting and precipitated pigment and drying it under mild conditions while maintaining its content of water of crystallization, the anticorrosive pigment being comprised of a homogeneous mixture and/or mixed crystals of which 10 to 95 mol% is calcium hydrogen phosphate dihydrate, the balance being magnesium hydrogen phosphate trihydrate and of which an at least 55 weight% proportion consists of particles with a size of up to 5 microns with a BET-surface area of at least 1 $m^2$/gram, preferably 2 to 5 $m^2$/gram.

Preferred features of the present process provide:

(a) for oxides, hydroxides, carbonates, basic carbonates or carboxylates, preferably acetates, to be used as the compounds of calcium and magnesium;

(b) for the calcium and magnesium compounds to be mixed jointly with water and, if desired, a water-soluble alkanol with the use of an agitator rotating at a speed of 60 to 800 rpm;

(c) for the homogeneous suspension or solution of the calcium/magnesium-compounds on the one hand and for the phosphoric acid or acid phosphate solution on the other to be jointly introduced into the dispersing means, in the event of the process being effected continuously;

(d) for the homogeneous suspension or solution of the calcium/magnesium-compounds to be circulated through the dispersing means and for it to be admixed therein with metered proportions of phosphoric acid or acid phosphate solution, in the event of the process being carried out discontinuously;

(e) for a 5 to 50 weight% homogeneous suspension of the calcium/magnesium-compounds to be reacted, inside the dispersing means, with phosphoric acid with a strength of 10 to 85 weight%, preferably 50 to 85 weight%;

(f) for the phosphoric acid or acid phosphate solution to be injected into the dispersing means;

(g) for the phosphoric acid to be used in the form of an aqueous or aqueous/alcoholic solution; and (h) for the dispersing means to comprise a screw pump or disperser operated by a rotor/stator-principle.

To the extent to which mixed crystals are contained in the pigments made in accordance with this invention, it is possible for those crystals to be defined by the summation formula $(Ca,Mg)HPO_4.2–3H_2O$. The pigments made by the process of this invention combine high particle fineness with very good dispersibility and are therefore easy to incorporate with dispersions.

It is possible to replace the water by an alkanol/water-mixture and homogeneously to suspend or dissolve finely pulverized calcium and magnesium compounds therein, the useful alkanols comprising methanol, ethanol, n-propanol and isopropanol. It is also possible to use phosphoric acid in admixture with one of the above alkanols and water, i.e. in the form of a dilute solution. In those cases in which it is desirable to use carbonates as the calcium and magnesium compounds, it is good practice to employ finely ground calcite, magnesite and dolomite and in those cases in which phosphoric acid is replaced by an acid phosphate, it should preferably be replaced by an aqueous or aqueous/alkanolic solution of a hydrogen phosphate or dihydrogen phosphate of sodium, potassium or ammonium. It is desirable to establish strong dispersing conditions in the reaction zone. This is why the reaction is effected inside the dispersing means itself. The calcium/magnesium-compounds on the one hand, and phosphoric acid and phosphates, respectively, on the other should preferably be used in stoichiometric ratios. Slight deviations therefrom permit the production of slightly basic or acid reaction products which are useful in one case or other. In the event of a water-soluble alkanol being used as the dispersant or solvent, it is necessary to provide for sufficient water in the reaction mixture in order to avoid the formation of anhydrous pigments. This is the reason why the reaction temperature should not be permitted to exceed 40° C. inasmuch as anhydrous products are otherwise liable to be formed which are unable successively to absorb sufficient water of crystallization. It is therefore good practice to operate at room temperature. The invention provides for the phosphoric acid or acid phosphate solution to be introduced into the reaction zone, i.e. the dispersing means, through a tubular structure; more preferably, however, it is injected through a nozzle structure as very fine pigments of very good dispersibility are obtained in this latter case.

A further beneficial effect of the present process resides in the fact that it is possible for the reactants to be used and reacted with one another in relatively high concentration; despite this, finely pulverulent products of very good dispersibility are always obtained. As a result, it is possible to keep the workup period short and to use apparatus fairly small in dimensions. A further highly beneficial effect of the present reaction resides in the formation of pigments which have a fineness of less than 20 microns, and of which the bulk has a fineness of even less than 5 microns. In other words, costly and energy-expensive grinding is rendered unnecessary, and the homogeneity of the pigments which is so desirable for a plurality of uses is retained.

After reaction in the dispersing means, the pigment suspension is filtered off or removed by means of a centrifuge as usual. The filter cake may be washed, if desired. Next, the pigment is dried under mild conditions in commercial drying apparatus, the temperature and sojourn time of the pigments in the drying apparatus being selected so as to exclude formation of anhydrous anticorrosive pigments.

EXAMPLE 1

1801.4 g of $CaCO_3$ and 80.6 g of MgO were introduced into a 30 liter vessel provided with a stirrer (500 rpm) and made with 20 liter of water into a uniformly concentrated suspension. By means of a pump, the suspension was metered into a funnel-shaped reaction zone which was provided with an axially disposed disperser. It was operated by the rotor/stator-principle. The dispersing means was a high efficiency disperser ULTRA-TURRAX (this is a registered Trade Mark of IKA-Werk, Janke und Kunkel KG., Staufen im Breisgau, Federal Republic of Germany). The disperser was operated at a speed of 10,000 rpm. Within 1 hour, the reaction zone was uniformly supplied with 2305.2 g of 85 weight% phosphoric acid. The mixture was circulated by pumping for 30 minutes and then filtered off through a suction filter. The calcium/magnesium/hydrogen-phosphate pigment so obtained was washed with water and acetone and dried for 3 hours at 60° C. in a drying cabinet. The pigment had a particle size of at most 12 microns, and 60 weight% of it had a size of less than 5 microns. The specific BET-surface are was 2.7 $m^2/g$. Analysis indicated that the pigment contained 21.0 weight% of Ca, 1.3 weight% of Mg and 18.0 weight% of P. 90.7 mol% was calcium hydrogen phosphate dihydrate and 9.3 mol% was magnesium hydrogen phosphate trihydrate.

EXAMPLE 2

The procedure was as in Example 1, but phosphoric acid was metered into the reaction zone through a nozzle structure. A pigment with a particle size of at most 10 microns was obtained. 75 weight% of it had a size of less than 5 microns. The BET-surface area was 2.8 $m^2/g$. The pigment was analyzed and found to contain 21.0 weight% of Ca, 1.4 weight% of Mg and 17.9 weight% of P. 90.1 mol% was $CaHPO_4.2H_2O$ and 9.9 mol% was $MgHPO_4.3H_2O$.

EXAMPLE 3

The procedure was as in Example 2, but 1000.8 g of $CaCO_3$ and 403.2 g of MgO were used. A pigment with a particle size of at most 15 microns was obtained. 65 weight% of it had a size of less than 5 microns. The BET-surface area was 2.5 $m^2/g$. The pigment was analyzed and found to contain 11.8 weight% of Ca, 7.0 weight% of Mg and 17.8 weight% of P. 50.6 mol% was $CaHPO_4.2H_2O$ and 49.4 mol% was $MgHPO_4.3H_2O$.

EXAMPLE 4

The procedure was as in Example 2, but 400.3 g of $CaCO_3$ and 645.0 g of MgO were used. A pigment with a particle size of at most 15 microns was obtained. 60 weight% of it had a size of less than 5 microns. The BET-surface area was 2.1 $m^2/g$. The pigment was analyzed and found to contain 5.0 weight% of Ca, 11.2 weight% of Mg and 17.9 weight% of P. 21.3 mol% was $CaHPO_4.2H_2O$ and 78.7 mol% was $MgHPO_4.3H_2O$.

EXAMPLE 5

100 kg of $CaCO_3$ and 10 kg of MgO were placed in a 1 $m^3$-vessel provided with a stirrer and made therein, with thorough agitation (100 rpm), and 500 l of water into a homogeneous suspension. The suspension was allowed freely to flow into a screw pump which was used (a) for repumping reaction mixture and (b) as the reaction zone. The screw pump was operated at a speed of 3000 rpm. Immediately upstream of the screw pump, the suspension was admixed by means of a nozzle structure, within 3 hours, with 145 kg of 85 weight% phosphoric acid. After the whole quantity of phosphoric acid had been added, the reaction mixture was circulated for 30 minutes and then filtered off with the use of a centrifuge. The calcium/magnesium/hydrogen-phosphate pigment so obtained was water-washed inside the centrifuge and dried in a fluidized bed drier, for 10 to 15 seconds at 70° C. The pigment had a particle size of at most 8 microns and 80 weight% of it had a size of less than 5 microns. The BET-surface area was 2.8 $m^2/g$. The pigment was analyzed and found to contain 18.8 weight% of Ca, 2.7 weight% of Mg and 18.0 weight% of P. 80.9 mol% was $CaHPO_4.2H_2O$ and 19.1 mol% was $MgHPO_4.3H_2O$.

EXAMPLE 6

The procedure was as in Example 2, but use was made of 1000 g of finely ground dolomite which contained 54.3% of CaO, 36.9% of MgO was suspended in 10 l of water. This suspension was reacted with 2170.3 g of 85 weight% phosphoric acid. The resulting pigment was analysed and found to contain 12.0 weight% of Ca, 6.7 weight% of Mg and 17.9 weight% of P. 52.1 mol% was $CaHPO_4.2H_2O$ and 47.9 mol% was $MgHPO_4.3H_2O$. The pigment had a particle size of at most 12 microns and 65 weight% of it had a size of less than 5 microns. The BET-surface area was 2.4 $m^2/g$.

EXAMPLE 7

The procedure was as in Example 2, but 1601 g of $CaCO_3$ and 161 g of MgO were suspended in 20 l of water, which was admixed with 3918 g of a solution made from 2304 g of 85 weight% phosphoric acid, the balance being ethanol (=50 weight% aqueous-ethanolic $H_3PO_4$-solution). The resulting pigment contained 18.8 weight% of Ca, 2.7 weight% of Mg and 17.8 weight% of P. 80.9 mol% was $CaHPO_4.2H_2O$ and 19.1 mol% was $MgHPO_4.3H_2O$. The pigment had a particle size of less than 12 microns and 70 weight% of it had a size of less than 5 microns. The BET-surface area was 2.4 m$^2$/g.

EXAMPLE 8

The procedure was as in Example 2, but 1601 g of $CaCO_3$ and 161 g of MgO were suspended in 20 l of 50 weight% ethanol which was admixed with 3918 g of a solution made from 2304 g of 85 weight% phosphoric acid, 634.5 g of water and 979.5 g of ethanol (=50 weight% aqueous-ethanolic $H_3PO_4$-solution). The resulting pigment contained 18.9 weight% of Ca, 2.7 weight% of Mg and 17.9 weight% of P. 80.9 mol% was $CaHPO_4.2H_2O$ and 19.1 mol% was $MgHPO_4.3H_2O$. The pigment had a particle size of less than 10 microns and 70 weight% of it had a size of less than 5 microns. Its BET-surface area was 2.5 m$^2$/g.

EXAMPLE 9

The procedure was as in Example 1, but a homogeneous suspension of 1585.7 g of $Ca(CH_3COO)_2.H_2O$ and 214.5 g of $Mg(CH_3COO)_2.4H_2O$ in 3 l of water was admixed, within 1 hour, with 2680.7 g of $Na_2HPO_4.7H_2O$ in 8 l of water. Precipitating pigment was filtered off, washed several times with water and a last time with acetone; next, it was dried for 2 hours in a drying cabinet at 70° C. The pigment obtained was analyzed and found to contain 20.9 weight% of Ca, 1.3 weight% of Mg and 17.9 weight% of P. 90.7 mol% was $CaHPO_4.2H_2O$ and 9.3 mol% was $MgHPO_4.3H_2O$. The pigment had a particle size of at most 12 microns and 65% of it had a size of less than 5 microns. The specific BET-surface area of the pigment was 2.7 m$^2$/g.

EXAMPLE 10

Testing pigments for dispersibility and anticorrosive efficiency.

1. Test formulation (the parts are by weight unless otherwise stated)

38.0 parts of alkyd resin (ALFTALAT AF 342; this is a registered Trade Mark of Hoechst Aktiengesellschaft, Frankfurt(M), Federal Republic of Germany);
4.0 parts of ethyl glycol;
4.0 parts of white spirit;
0.5 part of n-butanol;
0.5 part of antiskinning agent (ADDITOL XL 297; this is a registered Trade Mark of Hoechst Aktiengesellschaft, Frankfurt(M), Federal Republic of Germany);
1.0 part of dimethyl-dioctadecyl-ammonium montmorillonite (BENTONE 34; 10% strength; this is a registered Trade Mark of NL Industries Inc., New York, U.S.A.);
10.0 parts of talc;
11.0 parts of barium sulfate;
13.0 parts of titanium dioxide; and
18.0 parts of anticorrosive pigment.
100.0 parts On the basis of the above formulation, an anticorrosive pigment with a pigment concentration by volume of 32 (briefly termed PCV hereinafter) was made by varying the proportion of anticorrosive pigment. The term PCV as used herein denotes the ratio of pigment volume and filler volume to total volume of all non-volatile lacquer or varnish ingredients.

2. Description of dispersibility test

The various components of the test formulation were placed in a 1 l-vessel, mixed at a low speed (less than 1000 rpm) of the dissolver and then dispersed for 15 minutes at a stirring velocity of 8400 rpm. The vessel had a diameter of 100 mm and the stirring disc had a diameter of 50 mm. After dispersion, the resulting varnish was poured over a glass plate or plastics sheet in inclined position, allowed to drop off and then dried at 60° C.

The dispersibility was rated along DIN-specification 53 209 (DIN stands for German Industrial Standard); evaluated was the formation of fisheyes. More particularly, a score increasing from m 0 to m 5 was assigned to the number of fisheyes, and a score increasing from g 0 to g 5 was assigned to their size. Very good results are assigned the score m 1/g 1 whilst absolutely poor results would be assigned the score m 5/g 5.

3. Description of corrosion test

The pigments of the present invention and comparative pigments were applied to sheet metal specimens and the specimens were subjected to the following short time tests: Salt Spray Test (ASTM B 117-64; briefly referred to as SST hereinafter); Condensed Moisture Test (DIN 50017; DIN stands for German Industrial Standard; this test is briefly referred to as CWT hereinafter); Kesternich Test (DIN 50018; briefly referred to as KT hereinafter). The specimens so tested were inspected for: degree of corrosion (rust) (European scale for determining the degree of corrosion of anticorrosive paints—obtainable upon request from Fédération Nationale des Industries des Peintures, Vernis, Encres d'Imprimerie et Couleurs Fines, 42. Av. Marceau, 75008 Paris, France); degree of blister formation (DIN 53 209); and corrosion of metal underlying pigment of cross-scratched specimen. The standardized magnitudes defining the degree of corrosion and formation of blisters, and the corrosion depth (in millimeters) of the underlying metal were assigned an evaluation score (ES) of 0 to 100. More specifically, the score (decreasing from 100 to 0) assigned to the individual specimens was the lower the more serious the degree of corrosion or blister formation or corrosion of the underlying metal. Each of the above three tests provides for a maximum score of 300 to be assigned to a 100% corrosion-proof specimen.

In order to identify the efficiency of the corrosion-inhibiting pigment by a numerical value, the three evaluation scores (ES) were converted to a single characteristic value (CV). The salt spray test is the best to reveal the protective efficiency under long term outdoor conditions. This is the reason why the factor 2 has been assigned to the salt spray test in calculating the characteristic value in accordance with the following formula:

$$CV = \frac{2 \cdot ES\ (SST) + ES\ (CWT) + ES\ (KT)}{1200} \cdot 100$$

As can be seen, a pigment affording a 100% corrosionproof effect can be assigned a maximum characteristic value of 100.

The results obtained in the dispersibility test and corrosion test are indicated in the following Table.

TABLE

| Pigment | Dispersibility score | Evaluation score corrosion test |
| --- | --- | --- |
| CaHPO$_4$ . 2 H$_2$O | ml/g2 | 62 |
| MgHPO$_4$ . 3 H$_2$O | m2/g1 | 57 |
| pigment Example 1 | ml/g2 | 82 |
| pigment Example 2 | ml/g1 | 83 |
| pigment Example 3 | ml/g1 | 78 |
| pigment Example 4 | ml/g2 | 75 |
| pigment Example 5 | ml/g1 | 86 |
| pigment Example 6 | m2/g1 | 75 |
| pigment Example 7 | ml/g2 | 82 |
| pigment Example 8 | ml/g2 | 84 |
| pigment Example 9 | m2/g1 | 81 |

What is claimed is:

1. A process for making phosphorus-containing anticorrosive pigments with a particle size of at most 20 microns which comprises: converting, with agitation, fine pulverulent calcium and magnesium compounds selected from the group consisting of oxides, hydroxides, carbonates, basic carbonates or carboxylates together with water to a homogeneous suspension; intimately mixing said suspension inside a dispersing means rotating at a speed of 3000 to 10,000 rpm at 0° to 40° C. and in an approximately stoichiometric ratio with phosphoric acid or a solution of acid alkali metal or ammonium phosphates; separating resulting and precipitated pigment and drying it while maintaining its content of water of crystallization, the anticorrosive pigment being comprised of a homogeneous mixture or mixed crystals of which 10 to 95 mol% is calcium hydrogen phosphate dihydrate, the balance being magnesium hydrogen phosphate trihydrate, and of which an at least 55 weight% proportion consists of particles with a size of up to 5 microns with a BET-surface area of at least 1 m$^2$/g.

2. A process as claimed in claim 1 wherein the homogeneous suspension of the calcium/magnesium-compounds and the phosphoric acid or acid phosphate solution are jointly introduced into the dispersing means, the process being effected continuously.

3. A process as claimed in claim 1, wherein the calcium and magnesium compounds are mixed jointly with water with the use of an agitator rotating at a speed of 60 to 800 rpm.

4. A process as claimed in claim 1 wherein the homogeneous suspension of the calcium/magnesium-compounds is circulated through the dispersing means and admixed therein with metered proportions of phosphoric acid or acid phosphate solution, the process being effected discontinuously.

5. A process as claimed in claim 1, wherein a 5 to 50 weight% homogeneous suspension of the calcium/magnesium-compounds is reacted, inside the dispersing means, with phosphoric acid with a strength of 10 to 85 weight%.

6. A process as claimed in claim 1, wherein the phosphoric acid or acid phosphate solution is injected into the dispersing means.

7. A process as claimed in claim 1, wherein the phosphoric acid is used in the form of an aqueous or aqueous/alcoholic solution.

8. A process as claimed in claim 1 or 3, wherein the calcium and magnesium compounds are mixed jointly with water and a water-soluble alkanol.

* * * * *